(12) United States Patent
Choi

(10) Patent No.: US 10,852,971 B2
(45) Date of Patent: Dec. 1, 2020

(54) MEMORY CONTROLLER AND MEMORY SYSTEM HAVING THE SAME

(71) Applicant: SK hynix Inc., Gyeonggi-do (KR)

(72) Inventor: Hyoung Pil Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 179 days.

(21) Appl. No.: 16/121,086

(22) Filed: Sep. 4, 2018

(65) Prior Publication Data

US 2019/0250822 A1 Aug. 15, 2019

(30) Foreign Application Priority Data

Feb. 14, 2018 (KR) ........................ 10-2018-0018290

(51) Int. Cl.
*G06F 11/00* (2006.01)
*G06F 3/06* (2006.01)
*G06F 11/20* (2006.01)

(52) U.S. Cl.
CPC ............ *G06F 3/064* (2013.01); *G06F 3/0611* (2013.01); *G06F 3/0656* (2013.01); *G06F 3/0673* (2013.01); *G06F 11/2094* (2013.01); *G06F 2201/82* (2013.01)

(58) Field of Classification Search
CPC ..................................................... G06F 3/064
See application file for complete search history.

(56) References Cited

U.S. PATENT DOCUMENTS

| 5,506,692 A | * | 4/1996 | Murata | G06F 3/0601 358/1.13 |
|---|---|---|---|---|
| 2012/0089766 A1 | * | 4/2012 | Yu | G11C 5/143 711/103 |
| 2016/0378507 A1 | * | 12/2016 | Gupta | G06F 9/5011 713/2 |
| 2017/0192796 A1 | * | 7/2017 | Kunjuraman | G06F 8/65 |
| 2019/0179698 A1 | * | 6/2019 | Liu | G06F 3/0614 |
| 2019/0187902 A1 | * | 6/2019 | Lee | G11C 29/24 |
| 2019/0205038 A1 | * | 7/2019 | Lee | G06F 3/0679 |
| 2019/0324670 A1 | * | 10/2019 | Lee | G06F 3/061 |
| 2019/0354311 A1 | * | 11/2019 | Ji | G06F 3/0658 |
| 2020/0125281 A1 | * | 4/2020 | Yim | G06F 3/064 |

FOREIGN PATENT DOCUMENTS

KR 1020160127524 11/2016

* cited by examiner

*Primary Examiner* — Jonathan D Gibson
(74) *Attorney, Agent, or Firm* — IP & T Group LLP

(57) ABSTRACT

There are provided a memory controller and a memory system having the same. The memory controller includes: a control processor configured to set groups of memory blocks among memory blocks in a memory device to respective super blocks based on reference values, and store and execute firmware blocks respectively allocated to the super blocks; and a buffer memory configured to store information regarding the super blocks set by the control processor.

21 Claims, 11 Drawing Sheets

| [SPT] | |
|---|---|
| IND | PADD |
| SPB1 | D1/P1,P2/B1 |
| SPB2 | D1/P3,P4/B1 |
| SPB3 | D2/P1,P2/B2 |
| SPB4 | D2/P3,P4/B2 |
| SPB5 | D3/P1,P2/B3 |
| SPB6 | D3/P3,P4/B3 |
| ⋮ | ⋮ |
| SPBa | Dm/P3,P4/Bb |

240

MEMORY CONTROLLER AND MEMORY SYSTEM HAVING THE SAME

CROSS-REFERENCE TO RELATED APPLICATION

The present application claims priority under 35 U.S.C. § 119(a) to Korean patent application number 10-2018-0018290, filed on Feb. 14, 2018, the entire disclosure of which is incorporated herein by reference in its entirety.

BACKGROUND

1. Field of Invention

The present disclosure generally relates to a memory controller and a memory system having the same, and more particularly, to a memory controller for controlling a storage device, and a memory system having the memory controller.

2. Description of Related Art

Generally, a memory system may include one or more memory or storage devices and a memory controller.

The memory device(s) may store data or output stored data. For example, the memory device(s) may be configured as volatile memory device(s) in which stored data is extinguished when power supply is interrupted, or be configured as nonvolatile memory device(s) in which stored data is retained even when power supply is interrupted.

The memory controller may control data communication between a host and the memory device(s).

The host may communicate with the memory device(s) through the memory controller by using an interface protocol such as Peripheral Component Interconnect-Express (PCI-e or PCIe), Advanced Technology Attachment (ATA), Serial ATA (SATA), Parallel ATA (PATA), or Serial Attached SCSI (SAS). Other interfaces that may be used for communication between the host and the memory system may include various interfaces such as a Universal Serial Bus (USB), a Multi-Media Card (MMC), an Enhanced Small Disk Interface (ESDI), and Integrated Drive Electronics (IDE).

SUMMARY

Embodiments provide a memory controller for dividing memory blocks having similar characteristics into super blocks and managing the super blocks by using firmware, and a memory system including the memory controller.

According to an aspect of the present disclosure, there is provided a memory controller including: a control processor configured to set groups of memory blocks among memory blocks in a memory device to respective super blocks based on reference values, and store and execute firmware blocks respectively allocated to the super blocks; and a buffer memory configured to store information regarding the super blocks set by the control processor.

According to an aspect of the present disclosure, there is provided a memory system including: a memory device including memory blocks having a plurality of planes; and a memory controller configured to set groups of memory blocks among the memory blocks in the memory device to respective super blocks based on reference values, store firmware blocks respectively allocated to the super blocks, and manage each of the stored firmware blocks.

According to an aspect of the present disclosure, there is provided a memory system including: a memory device including planes, each of which includes memory blocks; and a memory controller configured to group some of memory blocks in at least two planes into at least one super block based on at least one of an input/output speed of the memory device, a page size, and a number of the planes, and execute firmware allocated for the at least one super block.

BRIEF DESCRIPTION OF THE DRAWINGS

Various embodiments will now be described more fully with reference to the accompanying drawings; however, elements and features of the present disclosure may be configured or arranged differently than shown or described herein. Thus, the present invention is not limited to the embodiments set forth herein. Rather, these embodiments are provided so that this disclosure is thorough and complete and fully conveys the scope of the embodiments to those skilled in the art. Throughout the specification, reference to "an embodiment" or the like is not necessarily to only one embodiment, and different references to "an embodiment" or the like are not necessarily to the same embodiment(s).

In the drawing figures, dimensions may be exaggerated for clarity. It will be understood that when an element is referred to as being "between" two elements, it can be the only element between the two elements, or one or more intervening elements may also be present. Like reference numerals refer to like elements throughout.

DETAILED DESCRIPTION

In the following detailed description, various embodiments of the present disclosure are shown and described, simply by way of example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or ° "coupled" to another element, it can be directly connected or coupled to the another element or be indirectly connected or coupled to the another element with one or more intervening elements interposed. In addition, when an element is referred to as "including" a component, this indicates that the element may further include one or more other components rather than excluding such other component(s), unless the context indicates otherwise.

Figure 1:
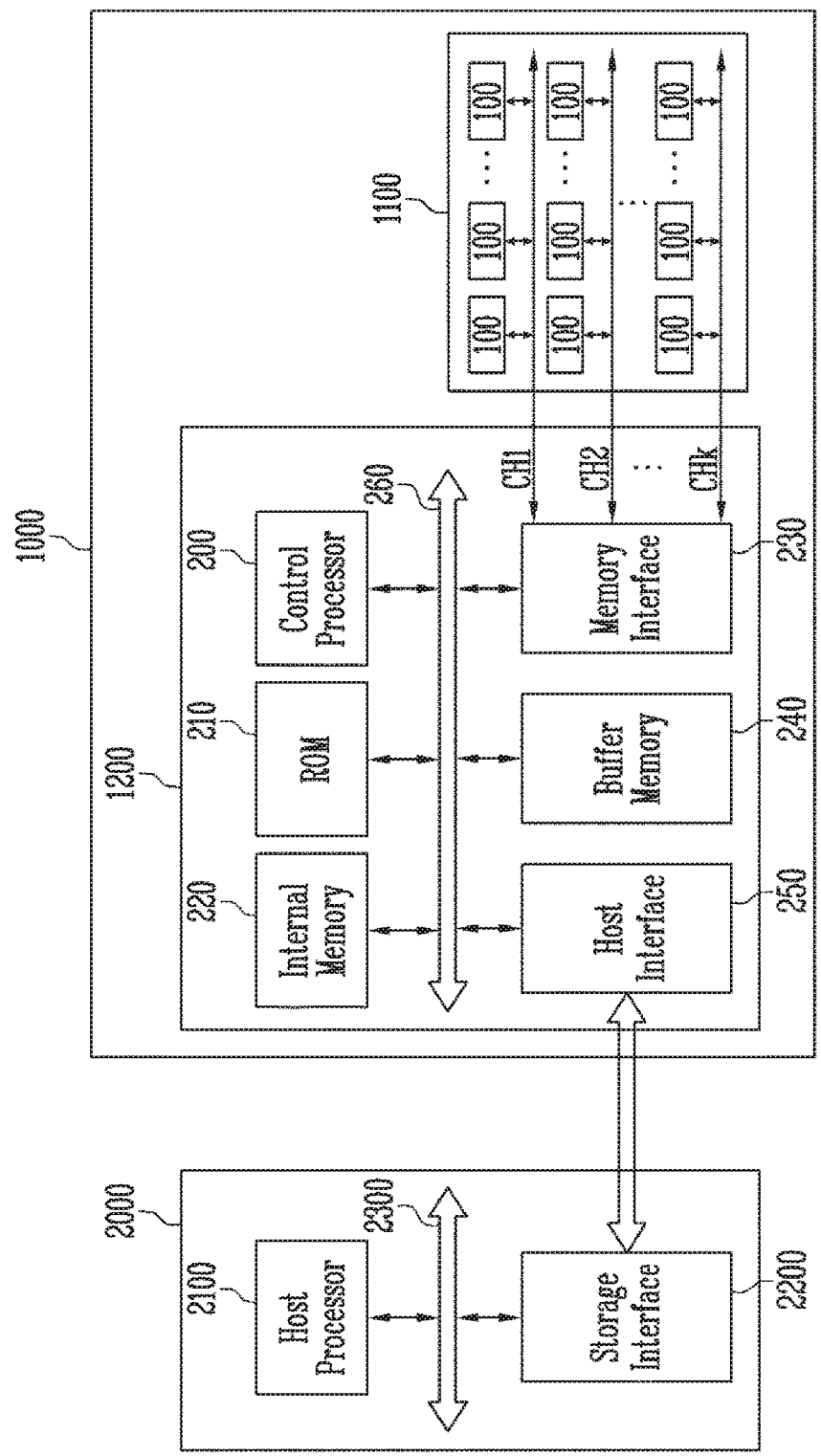
FIG. 1 is a diagram illustrating a memory system according to an embodiment of the present disclosure.

FIG. 1 is a diagram illustrating a memory system 1000 according to an embodiment of the present disclosure.

Referring to FIG. 1, the memory system 1000 may include a storage device 1100 for storing data and a memory controller 1200 for communicating between the storage device 1100 and a host 2000.

The storage device 1100 may include a plurality of memory devices 100. For example, the memory devices 100 may be implemented with volatile memory devices in which stored data is extinguished when the supply of power is shut off or interrupted. Alternatively, the memory devices 100 may be implemented with nonvolatile memory devices in which stored data is retained when the supply of power is shut off or interrupted. In FIG. 1, the memory devices 100 implemented with nonvolatile memory devices are illustrated as an example. For example, the nonvolatile memory device may be a flash memory device.

The memory devices 100 may be connected to a plurality of channels CH1 to CHk. For example, k groups of memory devices 100 may be connected to first to kth channels CH1 to CHk, respectively.

The memory controller 1200 may include a control processor 200, a read only memory (ROM) 210, an internal memory 220, a memory interface 230, a buffer memory 240, and a host interface 250.

The control processor 200 may perform various operations for controlling the storage device 1100 or generate a command and an address. The control processor 200 may run firmware according to a firmware code. To this end, the control processor 200 may include a firmware controller for run firmware. Also, the control processor 200 may include a super block controller for managing memory blocks in the memory devices 100 in units of super blocks. The super block is a logical unit, and may be a unit for managing a plurality of physical memory blocks as one logical block.

The ROM 210 is a read only memory, and may include a nonvolatile memory device in which information is retained even when power supply is interrupted. Since it is difficult to correct data stored in the ROM 210, the ROM 210 may store firmware codes for necessary operations of the memory system 1000, such as a booting firmware code that may be performed when the memory system 1000 is booted.

The internal memory 220 may store various information necessary for an operation of the memory controller 1200. For example, the internal memory 220 may include logical and physical address map tables. The address map tables may also be stored in the memory devices 100. An address map table stored in the memory devices 100 when the memory system 1000 is booted may be re-loaded to the internal memory 220. The internal memory 220 may be implemented with at least one of a Random Access Memory (RAM), a Dynamic RAM (DRAM), a Static RAM (SRAM), and a Tightly Coupled Memory (TCM).

The memory interface 230 may exchange a command, an address, data, and the like between the memory controller 1200 and the storage device 1100. For example, the memory interface 230 may transmit a command, an address, data, and the like to the memory devices 100 through the first to kth channels CH1 to CHk, and receive data and the like from the memory devices 100. The command may be an internal command, and the address may be a logical address.

The buffer memory 240 may temporarily store data when an operation of the memory system 1000 is performed. For example, in a program operation, the buffer memory 240 may temporarily store original program data until the program operation of a selected memory device 100 passes. Alternatively, in a read operation, the buffer memory 240 may temporarily store data read from a selected memory device 100 and then sequentially transmit the data to the host interface 250. Address map tables may also be stored in the buffer memory 240. The buffer memory 240 may be implemented with an SRAM or DRAM.

The host interface 250 may exchange a command, an address, data, and the like between the memory controller 1200 and the host 2000. For example, the host interface 250 may receive a request, an address, data, and the like from the host 2000, and transmit data and the like to the host 2000. The control processor 200, the ROM 210, the internal memory 220, the memory interface 230, the buffer memory 240, and the host interface 250 may communicate with each other through a bus 260.

The host 2000 may include a host processor 2100 and a storage interface 2200. The host processor 2100 and the storage interface 2200 may communicate with each other through a bus 2300.

The host processor 2100 may generate a program request capable of controlling the program operation of the memory system 1000 or a read request capable of controlling the read operation of the memory system 1000. For example, the program request may include a program external command and a physical address, which are transmitted to the memory system 1000. For example, the read request may include a read external command and a physical address, which are transmitted to the memory system 1000. In addition, various operation requests such as an erase request may be controlled.

The storage interface 2200 may communicate with the memory system 1000 by using any of various interface protocols such as a Peripheral Component Interconnect express (PCIe), an Advanced Technology Attachment (ATA), a Serial ATA (SATA), a Parallel ATA (PATA), a Serial Attached SCSI (SAS) or a Non-Volatile Memory express (NVMe). The storage interface 2200 is not limited to the above-described example, and may include various interfaces such as a Universal Serial Bus (USB), a Multi-Media Card (MMC), an Enhanced Small Disk Interface (ESDI), and Integrated Drive Electronics (IDE).

Figure 2:
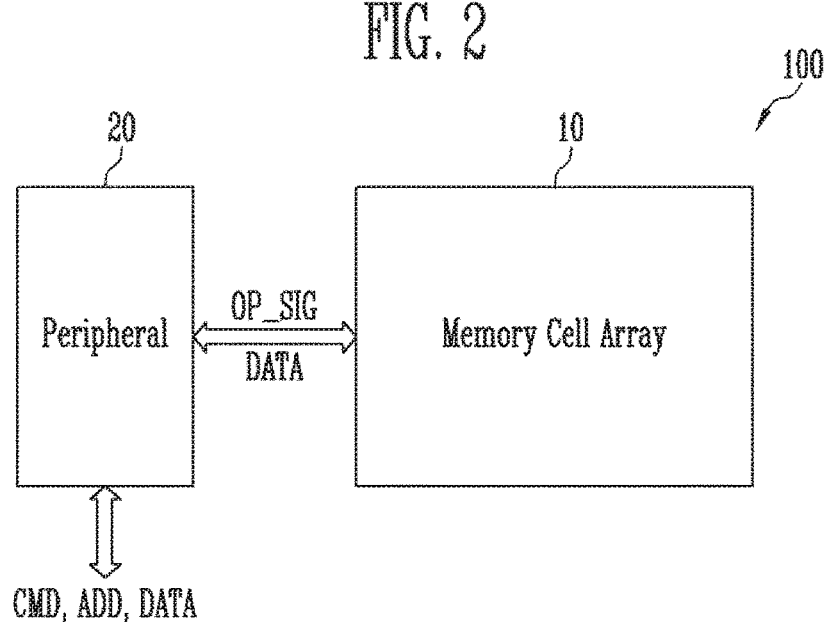
FIG. 2 is a diagram illustrating a memory device according to an embodiment of the present disclosure.

FIG. 2 is a diagram illustrating a memory device according to an embodiment of the present disclosure, for example, one of the memory devices 100 of FIG. 1.

Referring to FIG. 2, the memory device 100 may include a memory cell array 10 for storing data and a peripheral circuit 20 configured to perform a program operation, a read operation, an erase operation or the like.

The memory cell array 10 may include a plurality of planes, and the planes may include a plurality of memory blocks. The memory blocks may include a plurality of memory cells, and may be implemented in a two-dimensional (2D) or three-dimensional (3D) structure. For example, in memory blocks having the 2D structure, the memory cells may be arranged in the horizontal direction on a substrate. In the memory blocks having the 3D structure, the memory cells may be stacked in the vertical direction on a substrate.

The peripheral circuit 20 may be connected to a device, for example, the memory controller 1200 of FIG. 1 through a channel, and may exchange a command, an address ADD, and data DATA with the memory controller 1200 through the channel. The peripheral circuit 20 may perform a program, read or erase operation by outputting operation signals OP_SIG in response to the command CMD and the address ADD. In the program operation, data DATA may be written in the memory cell array 10 through the peripheral circuit 20. In the read operation, data DATA may be read from the memory cell array 10.

Figure 3:
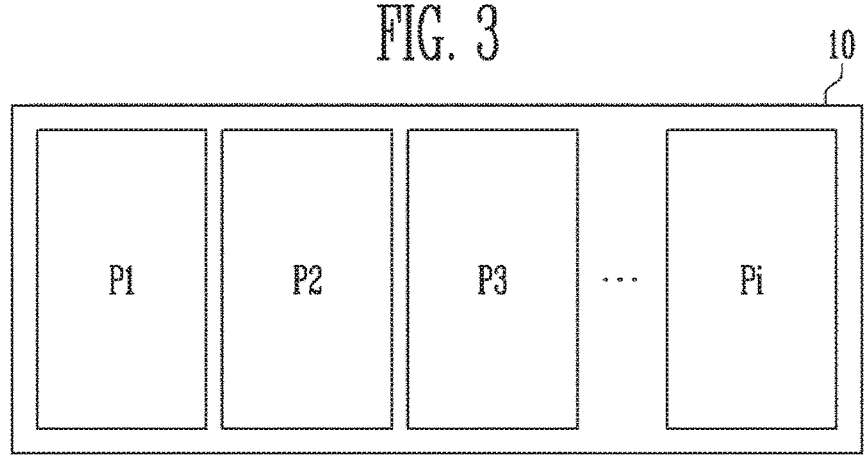
FIG. 3 is a diagram illustrating a memory cell array according to an embodiment of the present disclosure.

FIG. 3 is a diagram illustrating a memory cell array according to an embodiment of the present disclosure, for example, the memory cell array 10 of FIG. 2.

Referring to FIG. 3, the memory cell array 10 may include a plurality of planes P1 to Pi (where i is a positive integer). For example, first to ith planes P1 to Pi may be included in the memory cell array 10. The number of first to ith planes P1 to Pi may be changed depending on the memory device 100. In general, two or four planes may be included in one memory device 100.

Figure 4:
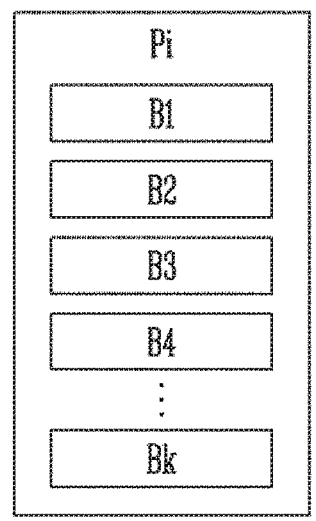
FIG. 4 is a diagram illustrating a plane according to an embodiment of the present disclosure.

FIG. 4 is a diagram illustrating a plane according to an embodiment of the present disclosure, for example, one of the planes of FIG. 3.

Referring to FIG. 4, the first to ith planes P1 to Pi of FIG. 3 may be configured identically to one another, and therefore, one plane, Pi, among the first to ith planes P1 to Pi, will be described as an example.

The ith plane Pi may include a plurality of memory blocks B1 to Bk (where k is a positive integer). For example, first to kth memory blocks B1 to Bk may be included in the ith plane Pi.

Figure 5:
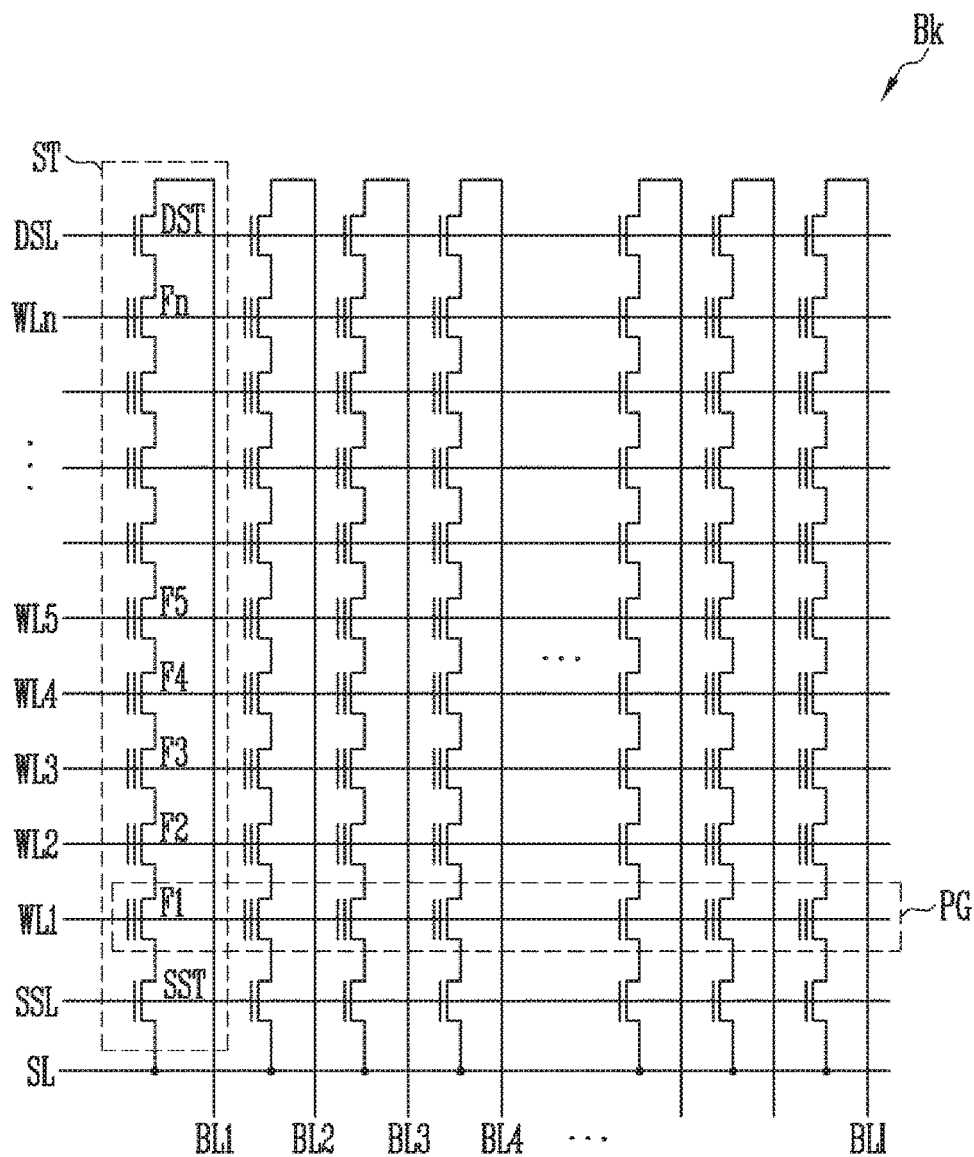
FIG. 5 is a circuit diagram illustrating an exemplary memory block of FIG. 4.

FIG. 5 is a circuit diagram illustrating a memory block according to an embodiment of the present disclosure, for example, the memory block of FIG. 4.

Referring to FIG. 5, the plurality of memory blocks B1 to Bk shown in FIG. 4 may be configured identically to one another, and therefore, any memory block, Bk, among the memory blocks B1 to Bk, will be described as an example.

The memory block Bk may include a plurality of cell strings ST connected between bit lines BL1 to BLl and a source line SL. For example, the cell strings ST may be respectively connected to the bit lines BL1 to BLl, and be commonly connected to the source line SL. Since the cell strings ST are configured similarly to one another, and therefore, a cell string ST connected to a first bit line BL1 will be described as an example.

The cell string ST may include a source select transistor SST, first to nth memory cells F1 to Fn (where n is a positive integer), and a drain select transistor DST, which are connected in series between the source line SL and the first bit line BL1. The number of source select transistors SST and drain select transistors DST is not limited to that shown in FIG. 5. The source select transistor SST may be connected between the source line SL and the first memory cell F1. The first to nth memory cells F1 to Fn may be connected in series between the source select transistor SST and the drain select transistor DST. The drain select transistor DST may be connected between the nth memory cell Fn and the first bit line BL1. Although not shown in the drawing, dummy cells may be further connected between the memory cells F1 to Fn or between the source select transistor SST and the drain select transistor DST.

Gates of the source select transistors SST included in different cell strings ST may be connected to a source select line SSL, gates of the first to nth memory cells F1 to Fn included in different cell strings ST may be connected to first to nth word lines WL1 to WLn, and gates of the drain select transistors DST included in different cell strings may be connected to a drain select line DSL. A group of memory cells connected to each of the word lines WL1 to WLn is referred to as a page PG. For example, a group of the first memory cells F1 connected to the first word line WL1 among the memory cells F1 to Fn included in different cell strings ST may become one page PG. Program and read operations may be performed in unit of pages PG.

Figure 6:
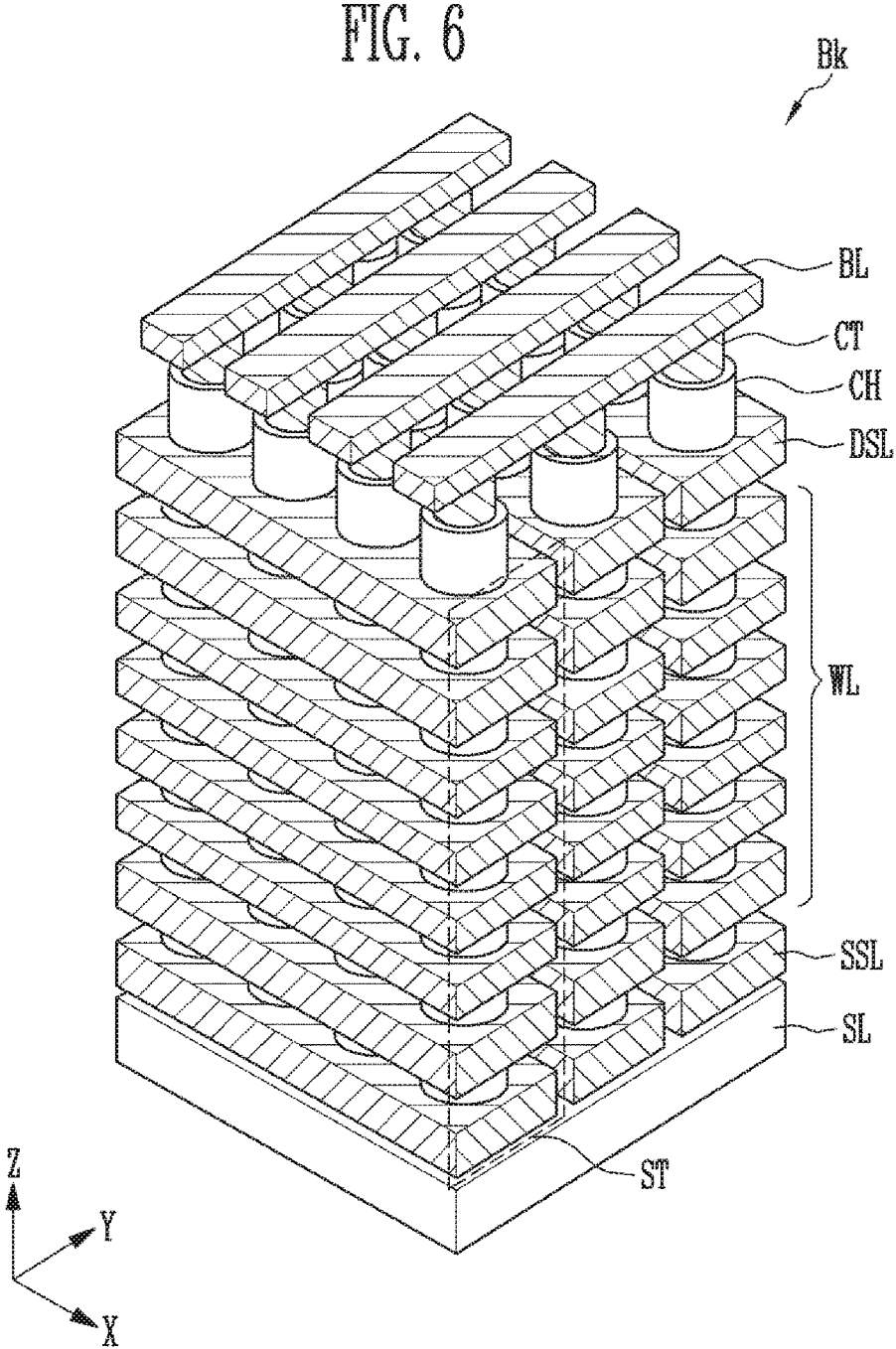
FIG. 6 is a diagram illustrating an exemplary, three-dimensionally configured memory block of FIG. 4.

FIG. 6 is a diagram illustrating a structure of a memory block according to an embodiment of the present disclosure. For example, FIG. 6 illustrates a memory block Bk of FIG. 4 that is three-dimensionally configured.

Referring to FIG. 6, the memory block Bk implemented in the three-dimensional structure may be formed in an I shape on a substrate in a direction vertical to the substrate (e.g., Z direction), and include a plurality of cell strings ST arranged between bit lines BL and a source line SL. Alternatively, a well may be formed instead of the source line SL. This structure is also referred to as a Bit Cost Scalable (BiCS) structure. For example, when the source line SL is formed in parallel to the substrate above the substrate, the cell strings ST having the BiCS structure may be formed in the Z direction on the top of the source line SL.

More specifically, the cell strings ST may be arranged in a first direction (e.g., X direction) and a second direction (e.g., Y direction). The cell strings ST may include source select lines SSL, word lines WL, and drain select lines DSL, which are stacked while being spaced apart from each other. The number of source select lines SSL, word lines WL, and drain select lines DSL is not limited to that shown in the drawing, and may be changed depending on the memory device 100. The cell strings ST may include vertical channel layers CH vertically penetrating the source select lines SSL, the word lines WL, and the drain select lines DSL, and the bit lines BL that are in contact with the tops of the vertical channel layers CH protruding to the tops of the drain select lines DSL and extend in the Y direction. Memory cells may be formed between the word lines WL and the vertical channel layers CH. Contact plugs CT may be further formed between the bit lines BL and the vertical channel layers CH.

Figure 7:
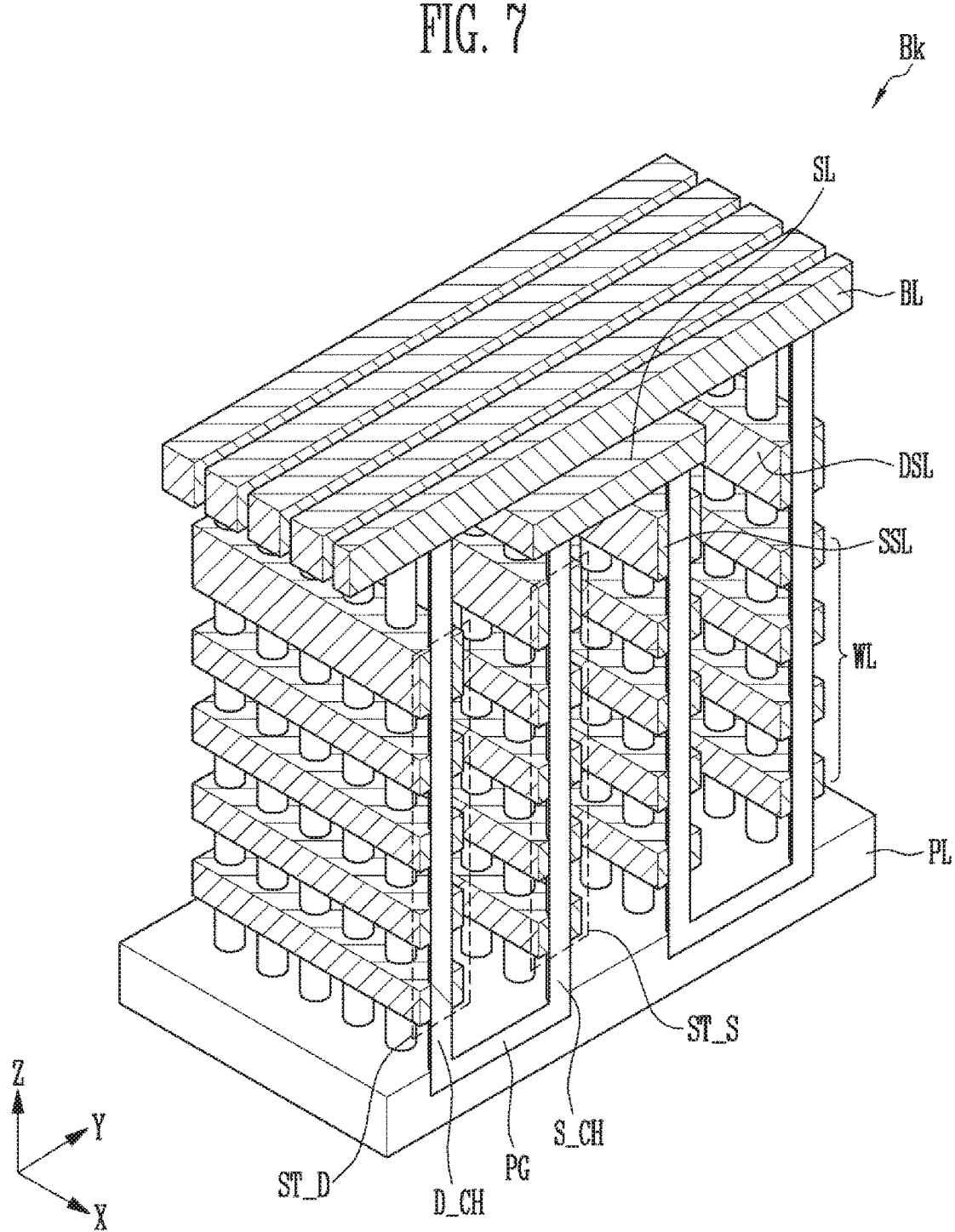
FIG. 7 is a diagram illustrating an exemplary three-dimensionally configured memory block of FIG. 4.

FIG. 7 is a diagram illustrating another example of a structure of a memory block according to an embodiment of the present disclosure. For example, FIG. 7 illustrates another embodiment in which the memory block of FIG. 4 is three-dimensionally configured.

Referring to FIG. 7, the memory block Bk having the three-dimensional structure may be formed on a substrate in a U shape in a direction vertical to the substrate (e.g., Z direction), and include source strings ST_S and drain strings ST_D, which are connected between bit lines BL and source lines SL and form pairs. The source string ST_S and the drain string ST_D may be connected to each other through a pipe gate PG to form a U-shaped structure. The pipe gate PG may be formed in a pipe line PL. More specifically, the source strings ST_S may be formed vertically to the substrate between the source line SL and the pipe line PL, and the drain strings ST_D may be formed vertically to the substrate between the bit lines BL and the pipe line PL. This structure is also referred to as a Pipe-shaped Bit Cost Scalable (P-BiCS) structure.

More specifically, the drain strings ST_D and the source strings ST_S may be arranged in a first direction (e.g., X direction) and a second direction (e.g., Y direction). The drain strings ST_D and the source strings ST_S may be alternately arranged along the Y direction. The drain strings ST_D may include word lines WL and a drain select line DSL, which are stacked while being spaced apart from each other, and drain vertical channel layers D_CH that vertically penetrate the word lines WL and the drain select line DSL. The source strings ST_S may include word lines WL and a source select line SSL, which are stacked while being spaced apart from each other, and source vertical channel layers S_CH that vertically penetrate the word lines WL and the source select line SSL. The drain vertical channel layers D_CH and the source vertical channel layers S_CH may be connected to each other by the pipe gate PG in the pipe line PL. The bit lines BL may be in contact with the tops of the drain vertical channel layers D_CH protruding to the top of the drain select line DSL, and extend in the Y direction.

The memory block Bk may be implemented in various structures in addition to the structures described in FIGS. 5 to 7.

Figure 8:
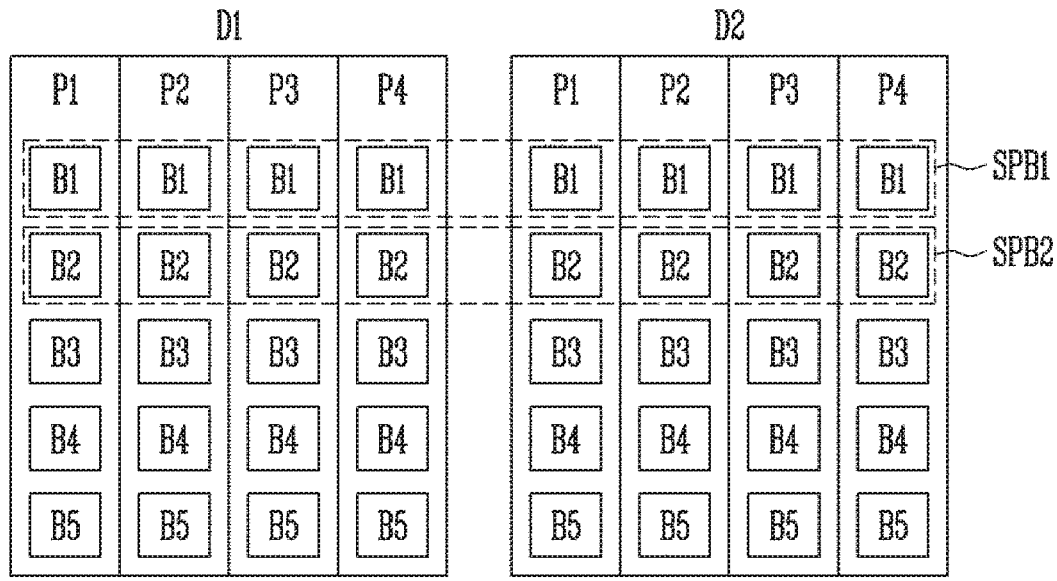
FIG. 8 is a diagram illustrating a super block according to an embodiment of the present disclosure.

FIG. 8 is a diagram illustrating a super block according to an embodiment of the present disclosure.

Referring to FIG. 8, first and second dies D1 and D2 are illustrated, and one die may be configured as one memory device 100. First and second dies D1 and D2 connected to a memory controller, for example, the memory controller 1200 of FIG. 1 through the same channel will be described as an example.

Each of the first and second dies D1 and D2 may include first to fourth planes P1 to P4, and each of the first to fourth planes P1 to P4 may include first to fifth memory blocks B1 to B5. The number of dies, planes, and memory blocks illustrated in FIG. 8 is exemplary, and therefore, may be changed depending on the memory device 100.

Some memory blocks among the first to fifth memory blocks B1 to B5 in the first to fourth planes P1 to P4 of the first and second dies D1 and D2 may be designated as a super block. The memory blocks designated as the super block may be logically operated as one block. The other memory blocks that are not included in the super block may be individually operated. For example, the first memory blocks B1 in the first to fourth planes P1 to P4 of the first and second dies D1 and D2 may form a first super block SPB1, and the second memory blocks B2 in the first to fourth planes P1 to P4 of the first and second dies D1 and D2 may form a second super block SPB2.

The memory blocks included in the first super block SPB1 may be driven by first firmware, and the memory blocks included in the second super block SPB1 may be driven by second firmware. The first firmware and the second firmware may be the same or be different from each other. However, the first firmware and the second firmware may be individually managed by the memory controller 1200 of FIG. 1.

Figure 9:
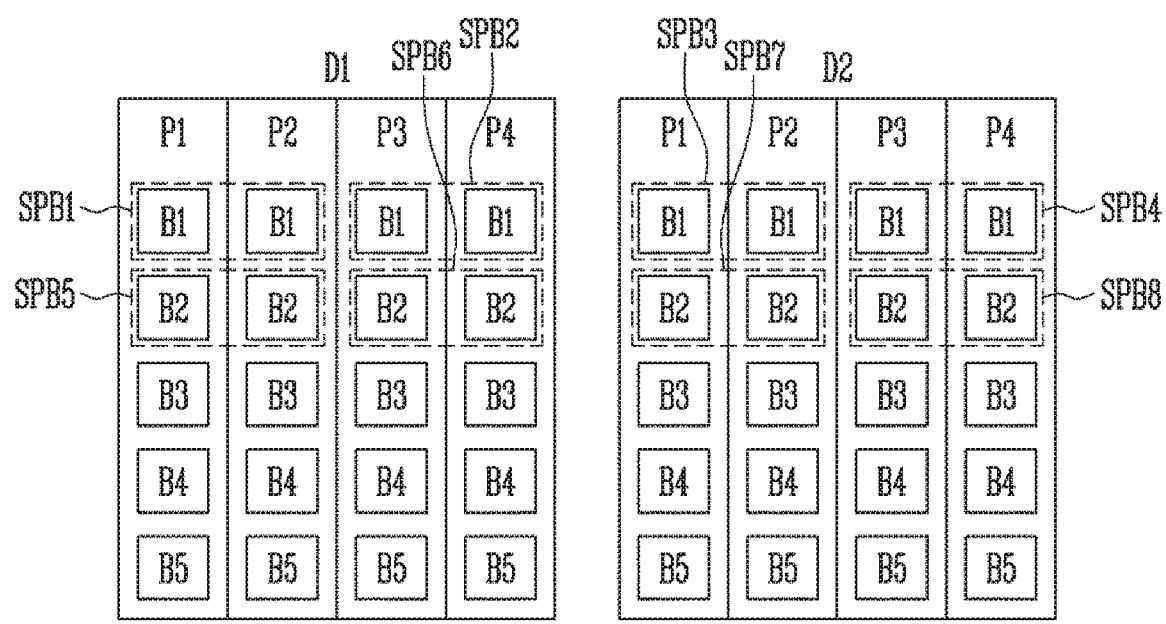
FIG. 9 is a diagram illustrating a super block according to an embodiment of the present disclosure.

FIG. 9 is a diagram illustrating a super block according to an embodiment of the present disclosure.

Referring to FIG. 9, each of first and second dies D1 and D2 may include first to fourth planes P1 to P4, and each of the first to fourth planes P1 to P4 may include first to fifth memory blocks B1 to B5. The number of dies, planes, and memory blocks illustrated in FIG. 9 is exemplary, and therefore, may be changed depending on the memory device 100.

The first memory blocks B1 of the first and second planes P1 and P2 of the first die D1 may constitute a first super block SPB1. The first memory blocks B1 of the third and fourth planes P3 and P4 of the first die D1 may constitute a second super block SPB2. The first memory blocks B1 of the first and second planes P1 and P2 of the second die D2 may constitute a third super block SPB3. The first memory blocks B1 of the third and fourth planes P3 and P4 of the second die D2 may constitute a fourth super block SPB4. In this manner, first to eighth super blocks SPB1 to SPB8 may be included in the first and second dies D1 and D2. The number of planes and memory blocks which are included in a super block may be changed depending on the memory block 100. That is, memory blocks included in some planes among a plurality of planes in a die may be designated as a super block. A plurality of planes may be included in a super block, and only one memory block in each of the plurality of planes may be included in the super block. That is, the number of memory blocks in the super block may be equal to that of the planes in the super block. For example, as shown in FIG. 9, in the die D1, the first memory block B1 in the first plane P1 and the first memory block B1 in the second plane P2 may be included in the first super block SPB1. The number of memory blocks in the first super block SPB1 is two, which is equal to the number of planes.

The number of planes in a super block may be set by considering physical and electrical characteristics of the memory device. For example, the number of planes may be set such that a value obtained by calculating an input/output speed, a page size, and a number of planes is similar to a read operation time.

This will be described in detail with reference to Table 1 and Table 2.

TABLE 1

| Reference value | MD1 | MD2 |
| --- | --- | --- |
| Read operation time (tR) | 50 µs | 50 µs |
| Number of planes (PL#) | 4 | 4 |

TABLE 2

| Reference value | MD1 | MD2 |
| --- | --- | --- |
| Input/output speed (IOs) | 667 MHz | 667 MHz |
| Normal page size (NPs) | 8 KB | 16 KB |
| Spare page size (SPs) | 1 KB | 2 KB |

Read operation times tR and numbers of planes PL# of first and second memory devices MD1 and MD2 are included in Table 1. It is assumed that, although the first memory device MD1 and the second memory device MD2 are different, the read operation times tR are the same, i.e., 50 µs, and the numbers of planes are the same, i.e., 4.

Input/output speeds IOs and page sizes of the first and second memory devices MD1 and MD2 that are the same as Table 1 are included in Table 2. The input/output speed represents a speed at which data is input/output in the corresponding memory device. The page size represents a storage capacity of one physical page. One physical page may be divided into a normal page and a spare page according to the usage thereof, and therefore, the page size may also be divided into a normal page size NPs and a spare page size SPs.

In each memory device, the number of planes included in one super block may be calculated by the following Equation 1.

$$(1/IOs) \times (NPs+SPs) \times NP = REF \qquad \text{Equation 1}$$

Referring to Equation 1, as shown in Table 2, IOs represents input/output speed of a memory device, NPs represents a normal page size, and SPs represents a spare page size. NP is a number of planes, which is to be obtained and corresponds to PL# of Table 1. REF is a reference value calculated by Equation 1, which is compared with the read operation time tR.

A method of calculating a number of planes included in the super block of the first memory device MD1 is as follows.

$$(1/667 \text{ MHz})*(8 \text{ KB}+1 \text{ KB})*3 = \text{about } 40 \text{ μs} \qquad \text{(REF1)}$$

$$(1/667 \text{ MHz})*(8 \text{ KB}+1 \text{ KB})*4 = \text{about } 54 \text{ μs} \qquad \text{(REF2)}$$

$$(1/667 \text{ MHz})*(8 \text{ KB}+1 \text{ KB})*5 = \text{about } 67 \text{ μs} \qquad \text{(REF3)}$$

A first reference value REF1 is obtained in the configuration in which the number of planes NP is 3. A second reference value REF2 is obtained in the configuration in which the number of planes NP is 4. A third reference value REF3 is obtained in the configuration in which the number of planes NP is 5.

First, differences between the first to third reference values REF1 to REF3 and the read operation time tR of the first memory device MD1 may be obtained. Next, the smallest absolute value may be obtained among the absolute values of the differences. Finally, the number of plane NP used in the equation having the smallest absolute value may be determined as the number of planes in the super block of the first memory device MD1. Since the read operation time tR is 50 μs in the first memory device MD1, the difference between the second reference value REF2 and the read operation time tR is smallest. Thus, four (4), which is the number of planes NP used in the equation by which the second reference value REF2 is calculated, is the number of planes in the super block of the first memory device MD1. Accordingly, in the first memory device MD1, four planes are included in one die, and memory blocks extracted from the four planes are included in one super block.

A method of calculating a number of planes included in the super block of the second memory device MD2 is as follows.

$$(1/667 \text{ MHz})*(16 \text{ KB}+2 \text{ KB})*1 = \text{about } 27 \text{ μs} \qquad \text{(REF4)}$$

$$(1/667 \text{ MHz})*(16 \text{ KB}+2 \text{ KB})*2 = \text{about } 54 \text{ μs} \qquad \text{(REF5)}$$

$$(1/667 \text{ MHz})*(16 \text{ KB}+2 \text{ KB})*3 = \text{about } 81 \text{ μs} \qquad \text{(REF6)}$$

A fourth reference value REF4 is a value obtained when the number of planes NP is 1. A fifth reference value REF5 is a value obtained when the number of planes NP is 2. A sixth reference value REF6 is a value obtained when the number of planes NP is 3.

First, differences between the fourth to sixth reference values REF4 to REF6 and the read operation time tR of the second memory device MD2 may be obtained. Next, the smallest absolute value may be obtained among the absolute values of the differences. Finally, the number of plane NP used in the equation having the smallest absolute value may be determined as the number of planes included in the super block of the second memory device MD2. Since the read operation time tR is 50 us in the second memory device MD2, the difference between the fifth reference value REF5 and the read operation time tR is smallest. Thus, two (2), which is the number of planes NP used in the equation by which the fifth reference value REF5 is calculated, is the number of planes in the super block of the second memory device MD2. Accordingly, in the second memory device MD2, four planes are included in one die, but memory blocks extracted from the two planes are included in one super block.

In this embodiment, firmware may be allocated with respect to each super block. For example, blocks or pieces of firmware for respectively managing the first to eighth super blocks SPB1 to SPB8 may be stored in the memory controller 1200 of FIG. 1. A method of managing firmware corresponding to each super block will be described as follows.

Figures 10, 11:
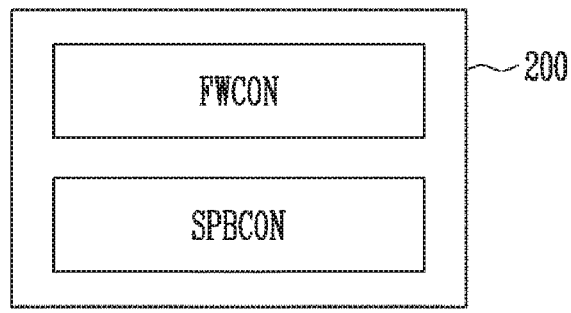
FIG. 10 is a diagram illustrating a control processor according to an embodiment of the present disclosure.
FIG. 11 is a diagram illustrating a super block table according to an embodiment of the present disclosure.

FIG. 10 is a diagram illustrating a control processor according to an embodiment of the present disclosure. FIG. 11 is a diagram illustrating a super block table SPT according to an embodiment of the present disclosure. For example, the control processor of FIG. 10 may be the control processor 200 of FIG. 1, and the super block table SPT of FIG. 11 may be implemented in the buffer memory 240 of FIG. 1.

Referring to FIG. 10, the control processor 200 may include a firmware controller FWCON and a super block controller SPBCON. The firmware controller FWCON may store blocks of firmware for respectively managing super blocks, and execute each firmware. A firmware block is firmware allocated for managing a specific super block. The super block controller SPBCON may transmit information on a selected super block to the firmware controller FWCON.

Referring to FIG. 11, the buffer memory 240 may store not only an address map table but also the super block table SPT.

Referring to FIGS. 10 and 11, the super block controller SPBCON may calculate a number of planes included in a super block of the memory device by performing a calculation operation according to Equation 1 described above. Also, the super block controller SPBCON may store the super block table SPT in the buffer memory 240 by generating a super block map according to the calculated number. Indices IND corresponding to super block addresses and a physical address PADD corresponding to each of the indices IND may be stored in the super block table SPT. The physical address PADD may include a die address, a plane address, and a memory block address. For example, addresses of the first die D1, the first and second planes P1 and P2, and the first memory block 131 may be stored in an index of the SPT to show their association with the first super block SPB1. That is, according to the super block table SPT, the first memory blocks B1 respectively included in the first and second planes P1 and P2, among the planes included in the first die D1, may be included in the first super block SPB1. In this manner, addresses of an mth die Dm (where m is a positive integer), the third and fourth planes P3 and P4, and a bth memory block Bb (where b is a positive integer) may be mapped to an index of an ath super block SPBa (where m is a positive integer).

According to the embodiment described above, memory blocks in each super block are set, and the super blocks are managed by allocating blocks of firmware to the respective super blocks, so that the super blocks and the firmware blocks may be easily managed. Various embodiments related to this arrangement will be described as follows.

Figure 12:
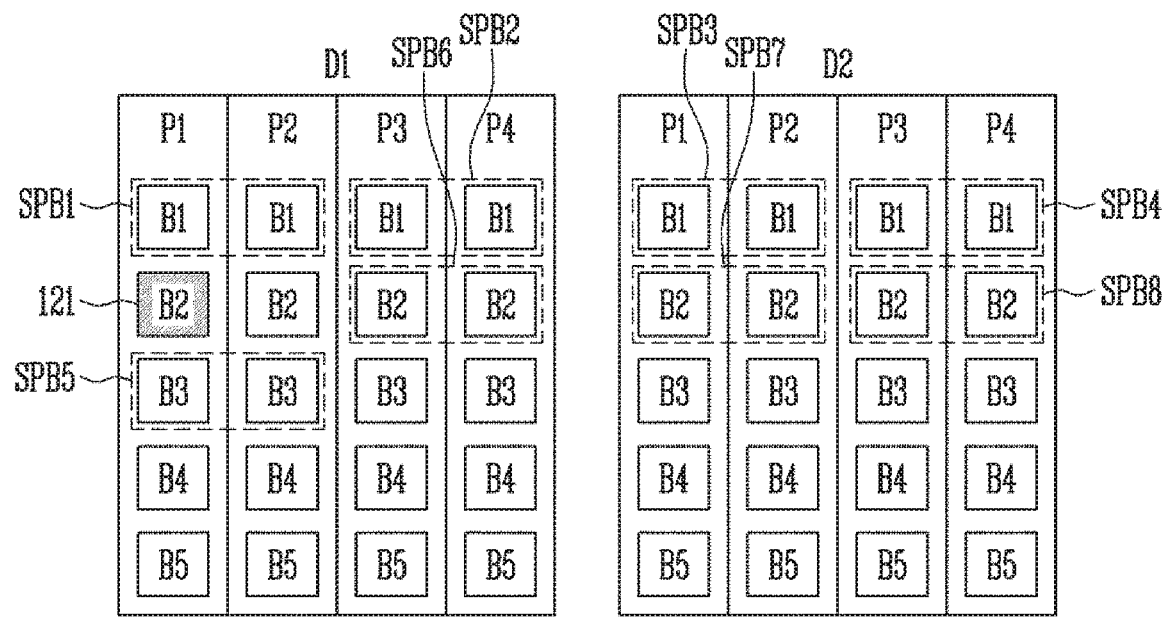
FIG. 12 is a diagram illustrating a super block setting method based on an initial bad condition of a memory block according to an embodiment of the present disclosure.

FIG. 12 is a diagram illustrating a super block setting method based on an initial bad condition of a memory block according to an embodiment of the present disclosure.

Referring to FIG. 12, when a memory block having an initial bad condition is detected in a manufacturing phase of the memory device 100, a super block including an initial bad block 121 may be changed to another memory block. That is, a physical address PADD of FIG. 11 corresponding to an index IND of FIG. 11 of the super block including the initial bad block 121 may be changed.

For example, the super block controller SPBCON of FIG. 10 may search for an index of the super block including the initial bad block 121 in the super block table SPT of the buffer memory 240 of FIG. 11, and change a physical address PADD corresponding to the identified index to some normal memory blocks that are not included in the super block. For example, consider that the initial bad block 121 is the second memory block B2 in the first plane P1 of the first die D1. When initial bad condition does not occur, the second memory blocks B2 in the first and second planes P1 and P2 of the first die D1 are mapped to the fifth super block SPB5. However, when initial bad condition is detected in some of the memory blocks, the other normal memory blocks may be mapped to the fifth super block SPB5. For example, the super block table SPT may be changed such that the third memory blocks B3 in the first and second planes P1 and P2 of the first die D1 are mapped to the fifth super block SPB5.

The firmware controller FWCON of FIG. 10 may drive firmware blocks corresponding to the fifth super block SPB5 without any change, based on super block information received from the super block controller SPBCON. That is, the firmware controller FWCON may drive firmware blocks to correspond to the respective super blocks. The firmware controller FWCON may drive the firmware blocks, based on address information received from the super block controller SPBCON. Thus, although the physical address PADD of the fifth super block SPB5 is initially changed, the firmware corresponding to the fifth super block SPB5 may be used without any change.

Figure 13:
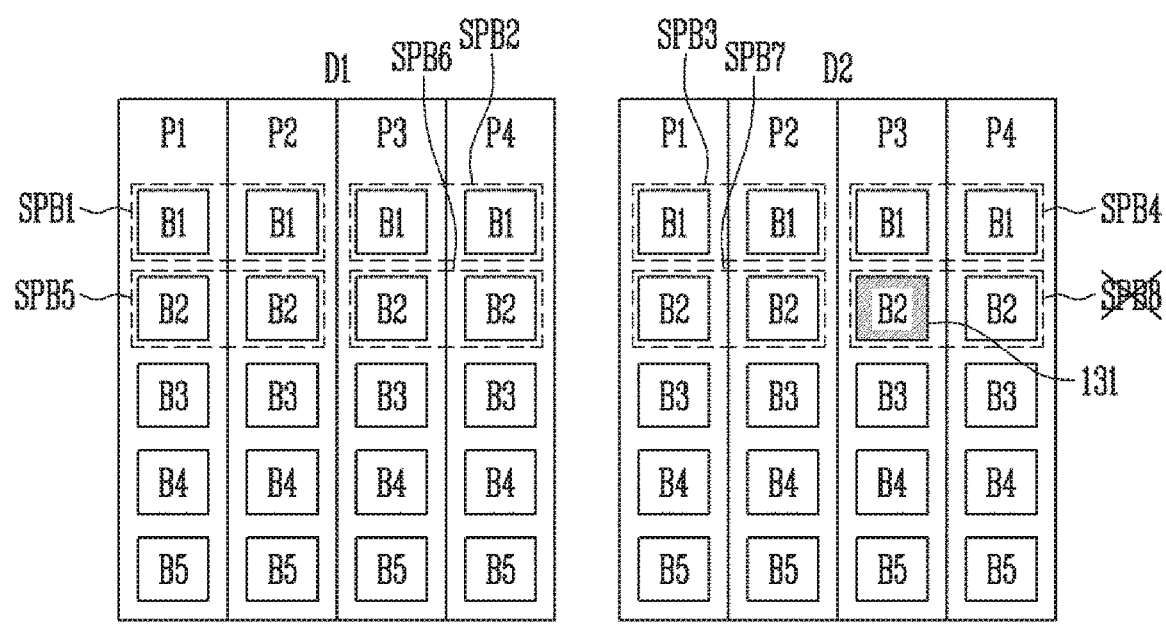
FIG. 13 is a diagram illustrating a super block setting method based on a progressive bad condition of a memory block according to an embodiment of the present disclosure.

FIG. 13 is a diagram illustrating a super block setting method based on a progressive bad condition of a memory block according to an embodiment of the present disclosure.

Referring to FIG. 13, unlike the situation depicted with reference to FIG. 12, when bad condition that occurs during use of the memory device 100, may be a progressive bad condition. For example, when a progressive bad block 131 occurs in the eighth super block SPB8, the super block controller SPBCON of FIG. 10 may delete mapping information of the eighth super block SPB8 in the super block table SPT. Since only the firmware allocated to the eighth super block SPB8 is deactivated, the firmware blocks respectively allocated to the other first to seventh super blocks SPB1 to SPB7 may be continuously maintained.

Figure 14:
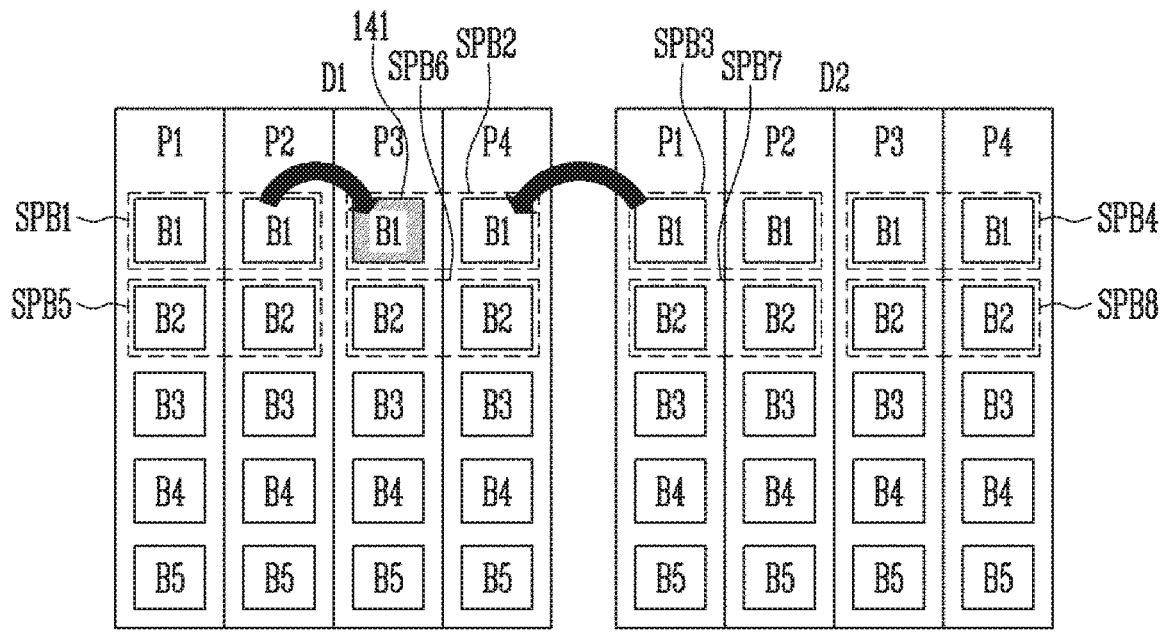
FIG. 14 is a diagram illustrating a method for restoring firmware when an error occurs in the firmware according to an embodiment of the present disclosure.

FIG. 14 is a diagram illustrating a method for restoring firmware when an error occurs in the firmware according to an embodiment of the present disclosure.

Referring to FIG. 14, the firmware controller FWCON may individually execute the firmware blocks respectively allocated to the first to eighth super blocks SPB1 to SPB8. When an error occurs in some firmware blocks, a firmware block in which the error occurs may be restored using another firmware block, i.e., firmware allocated to another super block. For example, when an error occurs (141) in firmware during an operation of the first memory block B1 of the third plane P3 included in the second super block SPB2, the firmware controller FWCON may restore the firmware allocated to the first super block SPB1 adjacent to the second super block SPB2, using the firmware of the second super block SPB2, or restore the firmware allocated to the third super block SPB3 adjacent to the second super block SPB2, using the firmware of the second super block SPB2.

Thus, although an error occurs in firmware allocated to one block, that firmware may be restored using firmware allocated to another super block. Accordingly, the reliability of the memory system 1000 may be improved.

Figure 15:
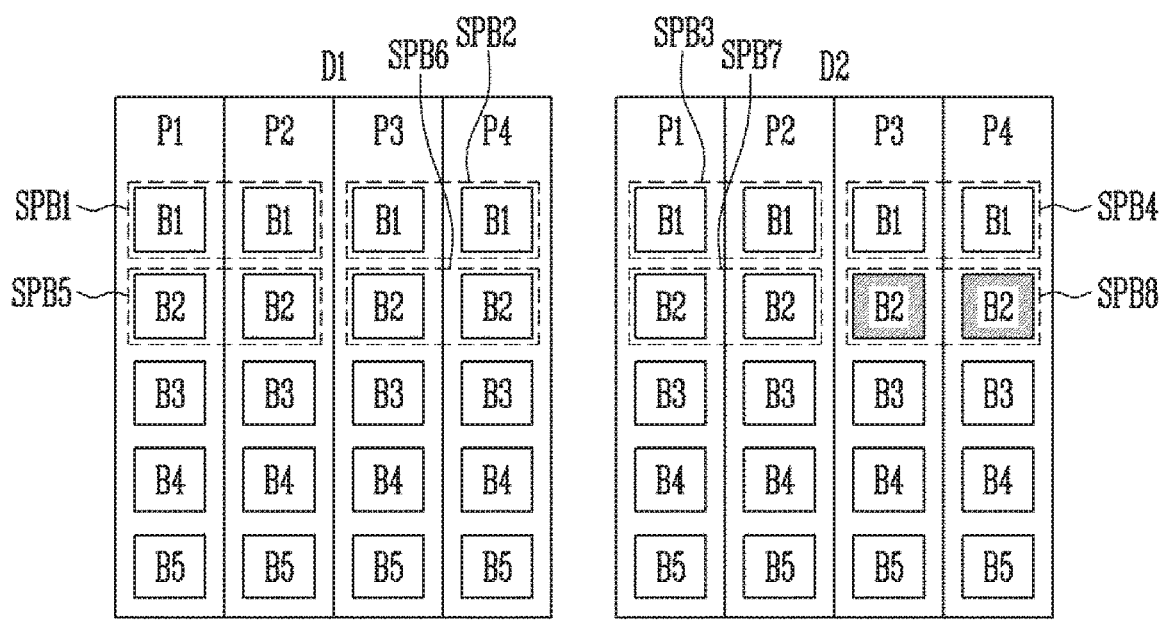
FIG. 15 is a diagram illustrating a firmware updating method according to an embodiment of the present disclosure.

FIG. 15 is a diagram illustrating a firmware updating method according to an embodiment of the present disclosure.

Referring to FIG. 15, the firmware controller FWCON may update the firmware allocated to each of the first to eighth super blocks SPB1 to SPB8. When sudden power off (SPO) occurs during firmware updating, the firmware controller FWCON may restore the state of firmware of which updating is stopped to a previous state, using another firmware that is not updated. For example, when sudden power off occurs during an update operation of the firmware allocated to the eighth super block SPB8, the firmware controller FWCON may restore the firmware of the eighth super block SPB8, using the firmware allocated to the fourth super block SPB4 or the seventh super block SPB7. Alternatively, the firmware controller FWCON may restore the firmware of the eighth super block SPB8, using any block of firmware that was not being updated when the SPO occurred.

As described above, when the super blocks are set according to a specific reference value, the operation speed of the memory device may be improved. Further, the firmware allocated to each of the super blocks may be managed, so that when an error occurs in a super block and its firmware, the firmware may be easily managed.

Figure 16:
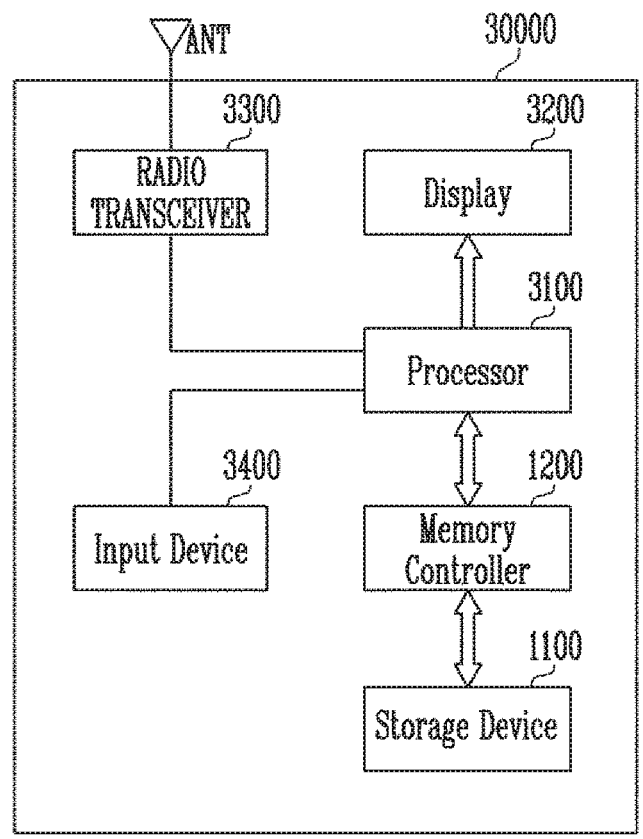
FIG. 16 is a diagram illustrating a memory system including a memory controller according to another embodiment of the present disclosure.

FIG. 16 is a diagram illustrating a memory system 30000 according to another embodiment of the present disclosure, for example, another embodiment of the memory system 1000 including the storage device 1100 and the memory controller 1200 shown in FIG. 1.

Referring to FIG. 16, the memory system 30000 may be implemented as a cellular phone, a smart phone, a tablet PC, a personal digital assistant (PDA), or a wireless communication device. The memory system 30000 may include the storage device 1100 and the memory controller 1200 capable of controlling an operation of the storage device 1100. The memory controller 1200 may control a data access operation of the storage device 1100, e.g., a program operation, an erase operation, a read operation, or the like under the control of a processor 3100.

Data programmed in the storage device 1100 may be output through a display 3200 under the control of the memory controller 1200.

A radio transceiver 3300 may transmit and receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the storage device 1100. Also, the radio transceiver 3300 may convert a signal output from the processor 3100 into a radio signal, and output the converted radio signal to an external device through the antenna ANT. An input device 3400 is capable of inputting a control signal for controlling an operation of the processor 3100 or data to be processed by the processor 3100. The input device 3400 may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 may be output through the display 3200.

In some embodiments, the memory controller 1200 capable of controlling an operation of the storage device 1100 may be implemented as a part of the processor 3100, or be implemented as a chip separate from the processor 3100.

Figure 17:
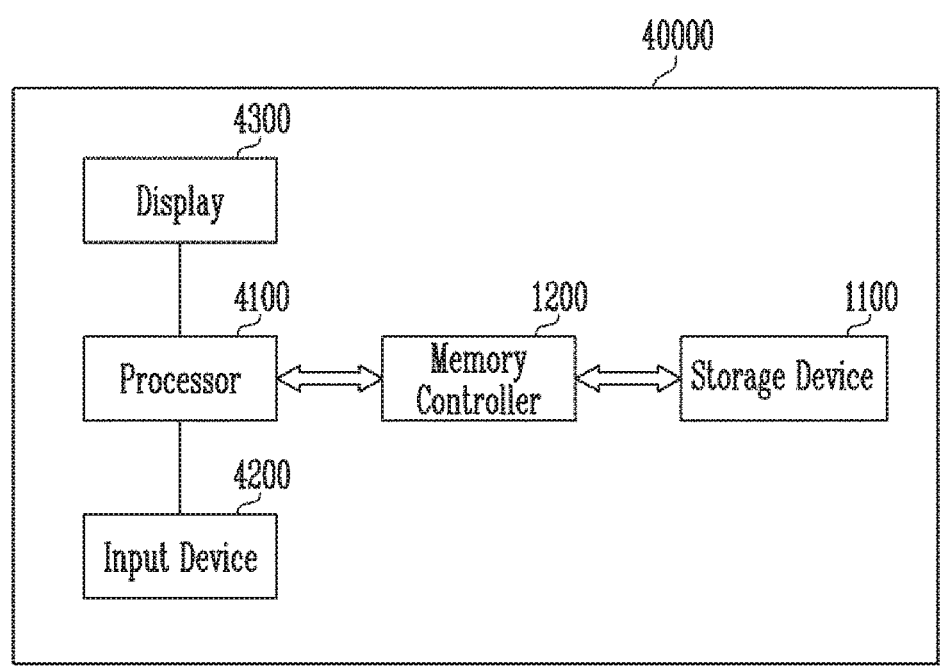
FIG. 17 is a diagram illustrating a memory system including a memory controller according to another embodiment of the present disclosure.

FIG. 17 is a diagram illustrating a memory system 4000 according to another embodiment of the present disclosure, for example, another embodiment of the memory system 1000 including the storage device 1100 and the memory controller 1200 shown in FIG. 1.

Referring to FIG. 17, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include the storage device 1100 and the memory controller 1200 capable of controlling a data processing operation of the storage device 1100.

A processor 4100 may output data stored in the storage device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the storage device 1100 may be implemented as a part of the processor 4100, or be implemented as a chip separate from the processor 4100.

Figure 18:
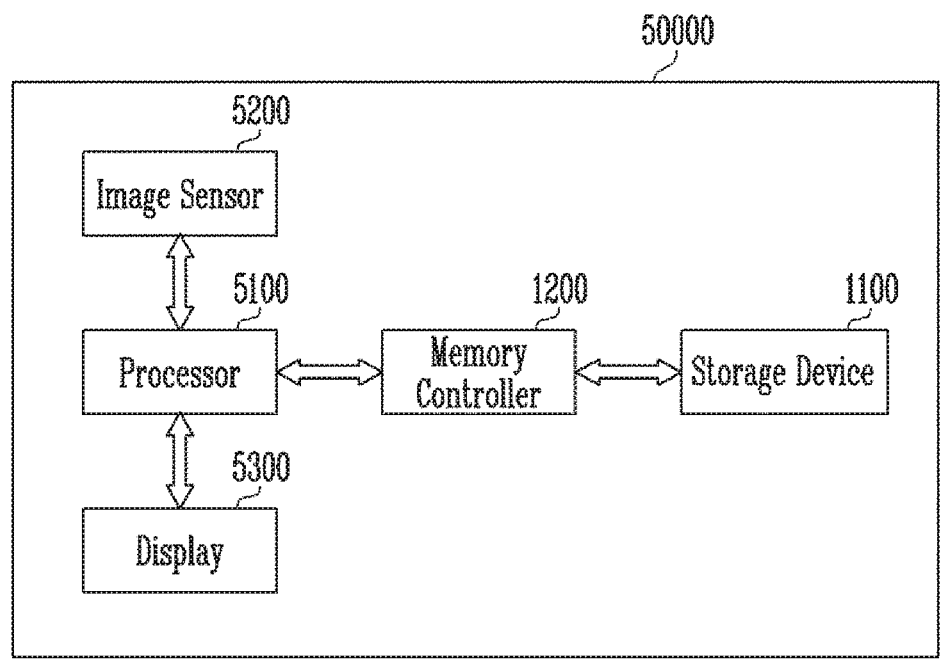
FIG. 18 is a diagram illustrating a memory system including a memory controller according to another embodiment of the present disclosure.

FIG. 18 is a diagram illustrating a memory system 5000 according to another embodiment of the present disclosure, for example, another embodiment of the memory system 1000 including the storage device 1100 and the memory controller 1200 shown in FIG. 1.

Referring to FIG. 18, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include the storage device 1100 and the memory controller 1200 capable of controlling a data processing operation of the storage device 1100, e.g., a program operation, an erase operation, or a read operation.

An image sensor 5200 of the memory system 50000 may convert an optical image into digital signals, and the converted digital signals may be transmitted to a processor 5100 or the memory controller 1200. Under the control of the processor 5100, the converted digital signals may be output through a display 5300, or be stored in the storage device 1100 through the memory controller 1200. In addition, data stored in the storage device 1100 may be output through the display 5300 under the control of the processor 5100 or the memory controller 1200.

In some embodiments, the memory controller 1200 capable of controlling an operation of the storage device 1100 may be implemented as a part of the processor 5100, or be implemented as a chip separate from the processor 5100.

Figure 19:
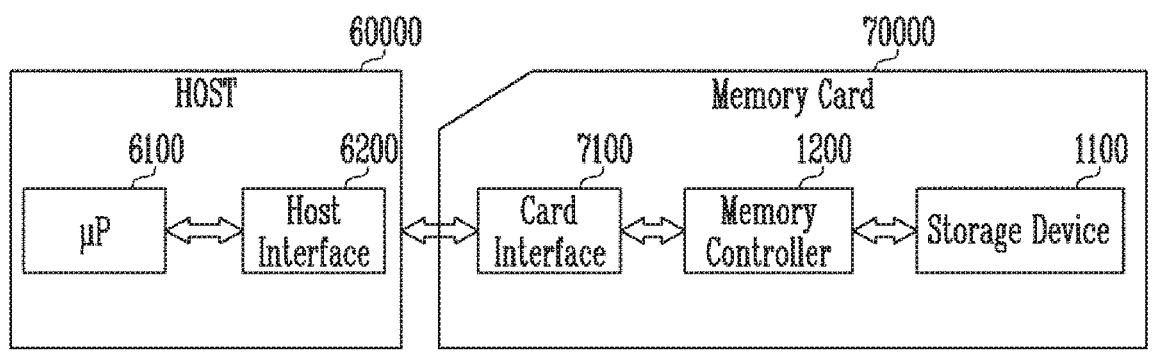
FIG. 19 is a diagram illustrating a memory system including a memory controller according to another embodiment of the present disclosure.

FIG. 19 is a diagram illustrating a memory system 70000 according to another embodiment of the present disclosure, for example, another embodiment of the memory system 1000 including the storage device 1100 and the memory controller 1200 shown in FIG. 1.

Referring to FIG. 19, the memory system 70000 may be implemented as a memory card or a smart card. The memory system 70000 may include the storage device 1100, the memory controller 1200, and a card interface 7100.

The memory controller 1200 may control data exchange between the storage device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a personal computer (PC), a tablet PC, a digital camera, a digital audio player, a cellular phone, console video game hardware, or a digital set-top box, the host interface 6200 may perform data communication with the storage device 1100 through the card interface 7100 and the memory controller 1200 under the control of a microprocessor (μP) 6100.

In the memory controller and a memory system having the same according to embodiments of the present disclosure, firmware is allocated to each of the super blocks, so that the firmware can be easily managed.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller controlling a memory device, the memory controller comprising:
   a control processor configured to allocate memory blocks to super blocks based on reference values, and to allocate one or more firmware blocks to each of the super blocks;

wherein the reference values are calculated using an input/output speed of the memory device, a page size of the memory device, and a number of planes included in the memory device.

2. The memory controller of claim 1, wherein the memory controller comprises:
a buffer memory configured to store information regarding the super blocks; and
a firmware controller configured to manage the firmware blocks respectively allocated to the super blocks.

3. The memory controller of claim 1, wherein the memory controller determines a number of planes to be included in each of the super blocks by considering physical and electrical characteristics of the memory device.

4. The memory controller of claim 1, wherein the memory controller determines the number of planes to be included in each of the super blocks by comparing a read operation time of the memory device with the reference values.

5. The memory controller of claim 1, wherein the memory controller sets, as the input/output speed, a speed at which data is input/output in the memory device.

6. The memory controller of claim 1, wherein the memory controller sets, as the page size, a storage capacity of any one physical page among physical pages in the memory device.

7. The memory controller of claim 1, wherein the memory controller determines the number of planes to be included in each of the super blocks using a reference value having a smallest difference from the read operation time of the memory device.

8. The memory controller of claim 2, wherein, when an initial bad memory block among the memory blocks is detected in the memory device, the firmware controller replaces the initial bad memory block with other normal memory blocks.

9. The memory controller of claim 2, wherein, when a progressive bad memory block among the memory blocks is detected in the memory device, the firmware controller deactivates firmware of a super block mapped to the progressive bad memory block.

10. The memory controller of claim 2, wherein, when an error occurs in some firmware blocks among all of the firmware blocks, the firmware controller restores the firmware block in which the error occurs, using a firmware block allocated to another super block.

11. The memory controller of claim 2, wherein, when sudden power off occurs when one of the firmware blocks is being updated, the firmware controller restores the firmware block of which updating is stopped to a previous state using another firmware block that was not being updated when the sudden power off occurred.

12. A memory system comprising:
a memory device including memory blocks having a plurality of planes; and
a memory controller configured to allocate memory blocks to super blocks based on reference values and to allocate one or more firmware blocks to the super blocks, and
wherein the reference values are calculated using an input/output speed of the memory device, a page size of the memory device, and a number of planes included in the memory device.

13. The memory system of claim 12, comprising:
a super block controller configured to generate the super blocks based on the reference values; and
a firmware controller configured to manage the firmware blocks respectively allocated to the super blocks.

14. The memory system of claim 13, wherein the super block controller determines a number of planes to be included in each of the super blocks by comparing a read operation time of the memory device with the reference values.

15. The memory system of claim 13, wherein the super block controller sets, as the input/output speed, a speed at which data is input/output in the memory device.

16. The memory system of claim 13, wherein the super block controller sets, as the page size, a storage capacity of any one physical page among physical pages in the memory device.

17. The memory system of claim 13, wherein the super block controller determines the number of planes to be included in each of the super blocks using a reference value having a smallest difference from the read operation time of the memory device among the reference values.

18. The memory system of claim 13, wherein, when an initial bad memory block among the memory blocks is detected in the memory device, the firmware controller replaces the initial bad memory block with other normal memory blocks.

19. The memory system of claim 13, wherein, when a progressive bad memory block in which a progressive bad occurs is detected, among the memory blocks in the memory device, the firmware controller deactivates firmware of a super block mapped to the progressive bad memory block.

20. The memory system of claim 13, wherein, when an error occurs in some firmware blocks, among all of the firmware blocks, the firmware controller restores the firmware block in which the error occurs, using a firmware block allocated to another super block.

21. The memory system of claim 13, wherein, when sudden power off occurs when one of the firmware blocks is being updated, the firmware controller restores the firmware block of which updating is stopped to a previous state using another firmware block that was not being updated when the sudden power off occurred.

* * * * *